United States Patent
Henry

(10) Patent No.: US 11,476,653 B2
(45) Date of Patent: Oct. 18, 2022

(54) DISCONNECT SYSTEM FOR MODULAR CABLE PROTECTORS

(71) Applicant: Stephen K. Henry, Billings, MT (US)

(72) Inventor: Stephen K. Henry, Billings, MT (US)

(*) Notice: Subject to any disclaimer, the term of this patent is extended or adjusted under 35 U.S.C. 154(b) by 0 days.

(21) Appl. No.: 17/485,843

(22) Filed: Sep. 27, 2021

(65) Prior Publication Data

US 2022/0014004 A1    Jan. 13, 2022

Related U.S. Application Data

(63) Continuation-in-part of application No. 16/549,319, filed on Aug. 23, 2019.

(60) Provisional application No. 62/732,147, filed on Sep. 17, 2018.

(51) Int. Cl.
*H02G 3/34* (2006.01)

(52) U.S. Cl.
CPC .................... *H02G 3/34* (2013.01)

(58) Field of Classification Search
CPC .... H02G 3/0437; H02G 3/0608; H02G 3/185; H02G 3/06; H02G 9/025; H02G 9/02; H02G 9/04; H02G 3/0418; H02G 3/0487; H02G 3/34; H02G 15/08; H02G 9/00; H02G 9/065; H01B 7/0045; H01B 13/012
See application file for complete search history.

(56) References Cited

U.S. PATENT DOCUMENTS

| | | | | |
|---|---|---|---|---|
| 3,888,186 | A * | 6/1975 | Jentzsch | H02G 9/065 104/275 |
| 5,095,822 | A * | 3/1992 | Martin | H02G 9/04 174/101 |
| 5,123,776 | A | 6/1992 | Lang et al. | |
| 5,566,622 | A | 10/1996 | Ziaylek et al. | |
| 5,745,975 | A * | 5/1998 | Heisner | H01R 43/28 29/564.6 |
| 5,777,266 | A * | 7/1998 | Herman | H02G 9/04 138/155 |
| D412,490 | S | 8/1999 | Henry | |
| 6,202,565 | B1 | 3/2001 | Henry | |

(Continued)

FOREIGN PATENT DOCUMENTS

| | | |
|---|---|---|
| CN | 203807909 | 9/2014 |
| FR | 2943077 A1 | 9/2010 |
| WO | WO 2016/153734 A1 | 9/2016 |

*Primary Examiner* — William H. Mayo, III
*Assistant Examiner* — Krystal Robinson
(74) *Attorney, Agent, or Firm* — Cochran Freund & Young

(57) ABSTRACT

A disconnect system for modular cable protectors includes tool engagement features to facilitate disassembly of the side ramps from the center sections of the cable protectors using a hand tool. The tool is used to removably engage these tool engagement features to enable the user to exert an upward force to disengage the edge connectors and end connectors on the side ramps and center section of each cable protector. For example, the tool engagement features can be openings (e.g., slots or recesses) in the top surface of the side ramp with undercuts adjacent to the lower ends of the openings. A tool with vertical rods is manually inserted into the openings to disengage the side ramps. Horizontal projections at the bottom of the vertical rods engage the undercuts and allow the user to disengage the side ramps by lifting upward on the tool.

11 Claims, 15 Drawing Sheets

(56) References Cited

U.S. PATENT DOCUMENTS

| | | | | |
|---|---|---|---|---|
| 6,481,036 B1 * | 11/2002 | Duvall | ............... | H02G 9/04 |
| | | | | 414/921 |
| 6,499,410 B1 | 12/2002 | Berardi | | |
| 6,747,212 B1 * | 6/2004 | Henry | ............... | H02G 3/283 |
| | | | | 174/101 |
| 6,878,881 B1 * | 4/2005 | Henry | ............... | H02G 9/04 |
| | | | | 174/101 |
| 7,145,078 B2 * | 12/2006 | Henry | ............... | H02G 9/04 |
| | | | | 174/101 |
| 7,145,079 B1 * | 12/2006 | Henry | ............... | H02G 3/30 |
| | | | | 174/101 |
| 7,309,836 B2 * | 12/2007 | Lubanski | ............... | H02G 9/04 |
| | | | | 174/101 |
| 8,001,643 B1 * | 8/2011 | James | ............... | H02G 9/04 |
| | | | | 174/101 |
| 8,119,914 B2 * | 2/2012 | Lubanski | ............... | H02G 9/025 |
| | | | | 174/101 |
| 8,309,850 B2 | 11/2012 | Henry | | |
| 8,434,739 B1 | 5/2013 | Connolly | | |
| 8,791,363 B2 | 7/2014 | Lubanski | | |
| D717,248 S | 11/2014 | Coffman | | |
| 9,059,574 B2 | 6/2015 | Coffman et al. | | |
| 9,103,075 B2 | 8/2015 | Kaylor et al. | | |
| 9,438,022 B2 | 9/2016 | Lioi | | |
| D928,101 S * | 8/2021 | Henry | ............... | D13/155 |
| 2014/0311048 A1 | 10/2014 | Hill et al. | | |
| 2016/0023873 A1 | 1/2016 | Kasan | | |
| 2019/0052071 A1 * | 2/2019 | Henry | ............... | B66F 15/00 |
| 2019/0334331 A1 * | 10/2019 | Henry | ............... | H02G 3/0475 |

* cited by examiner

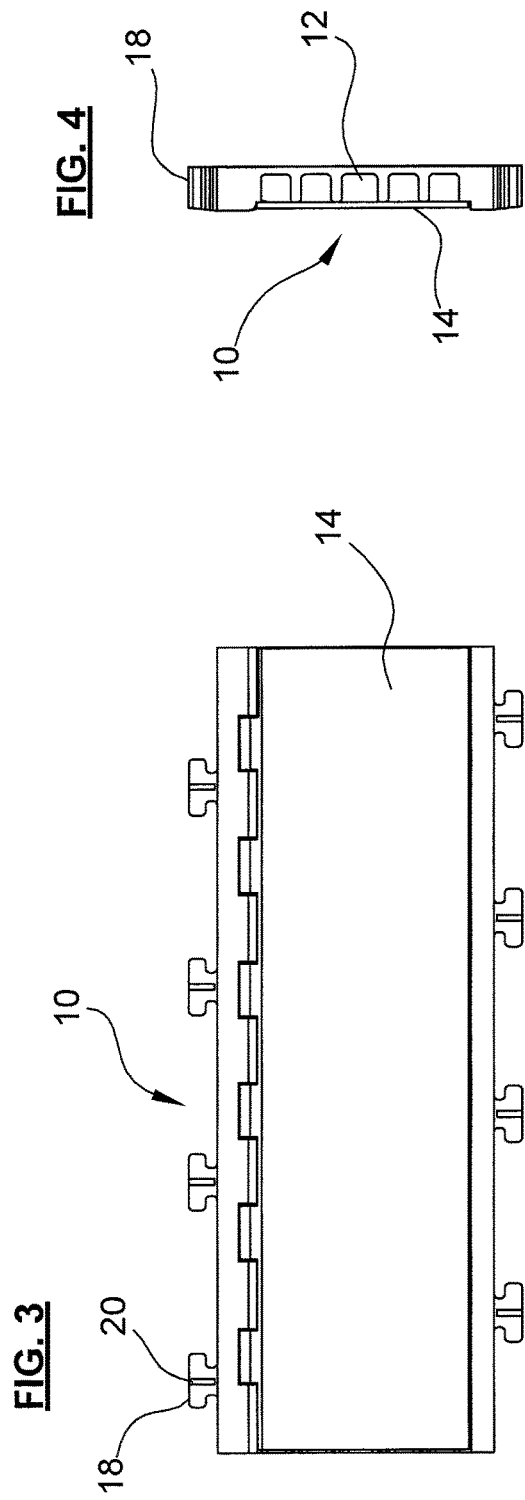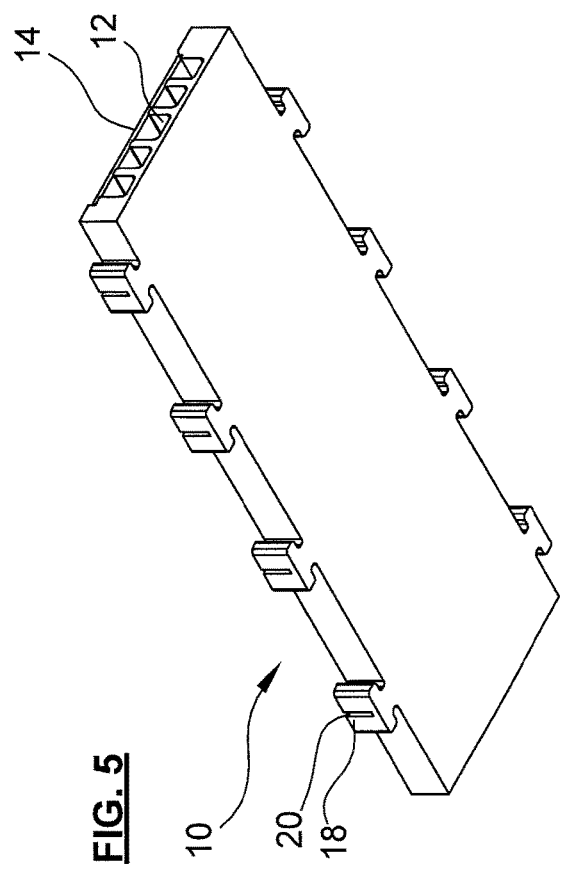

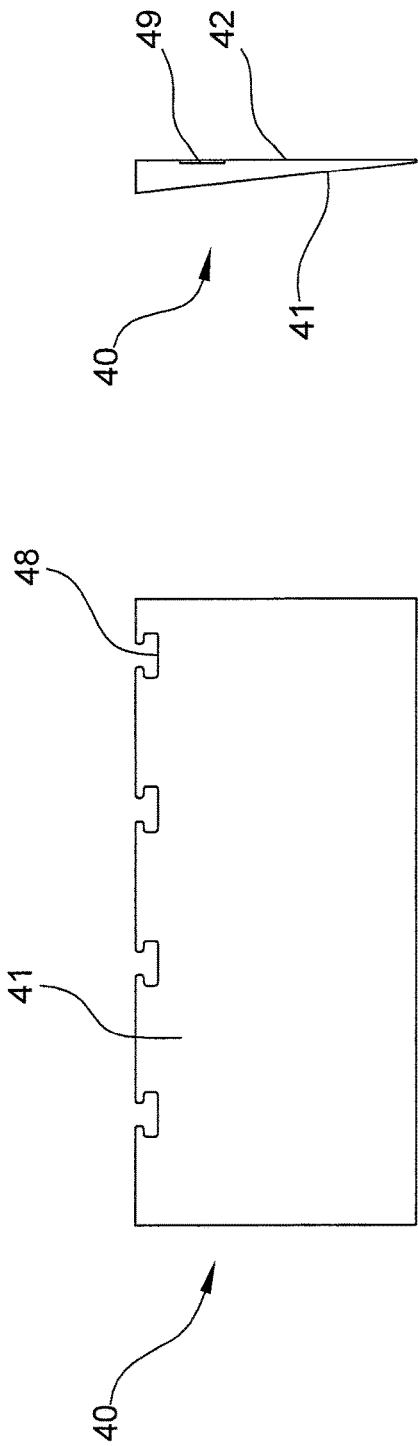
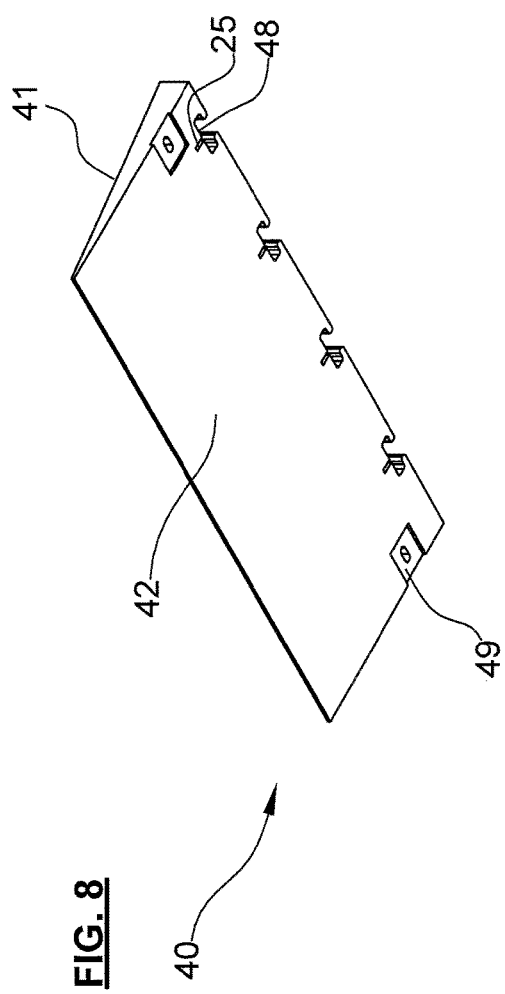

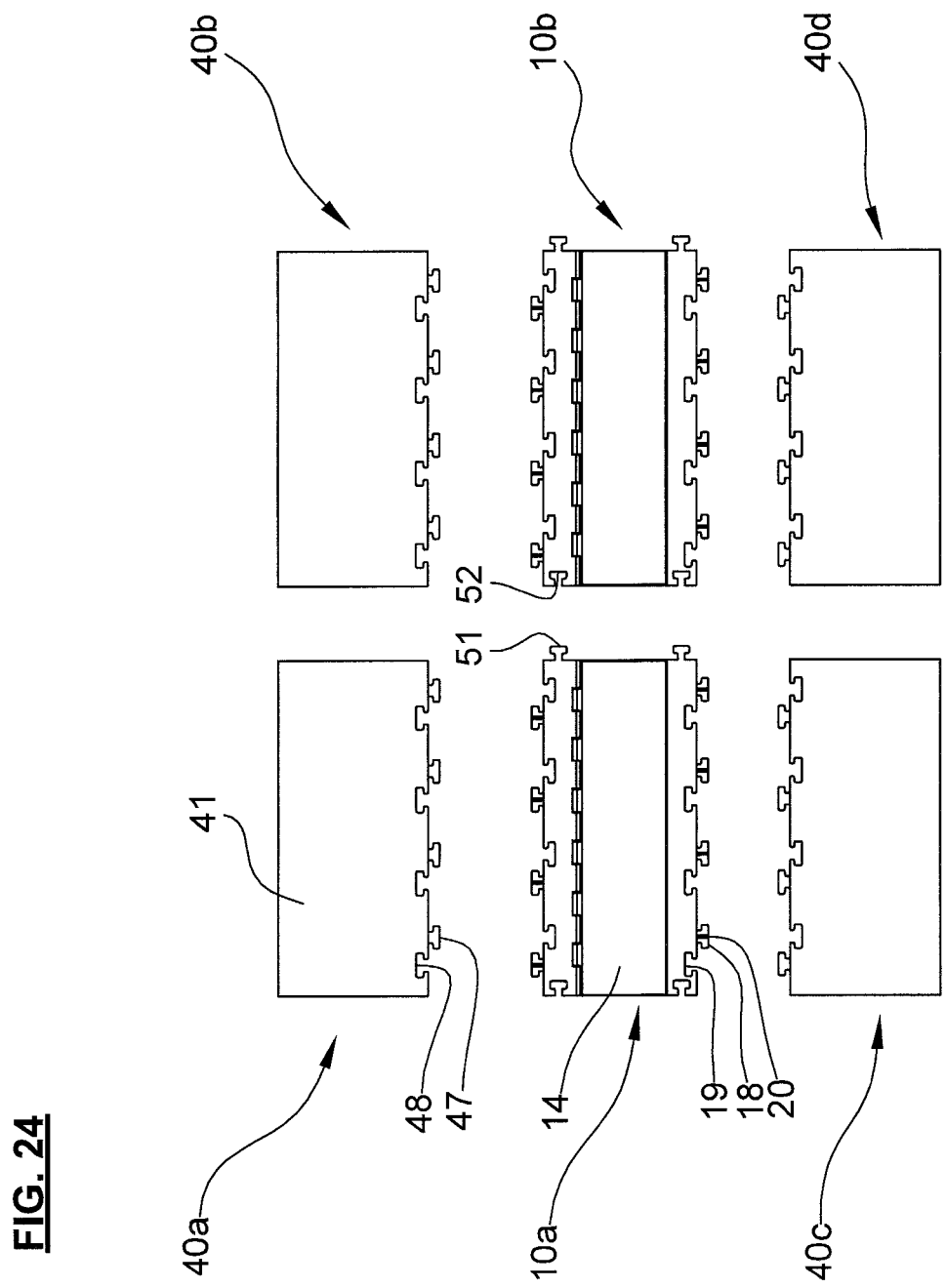

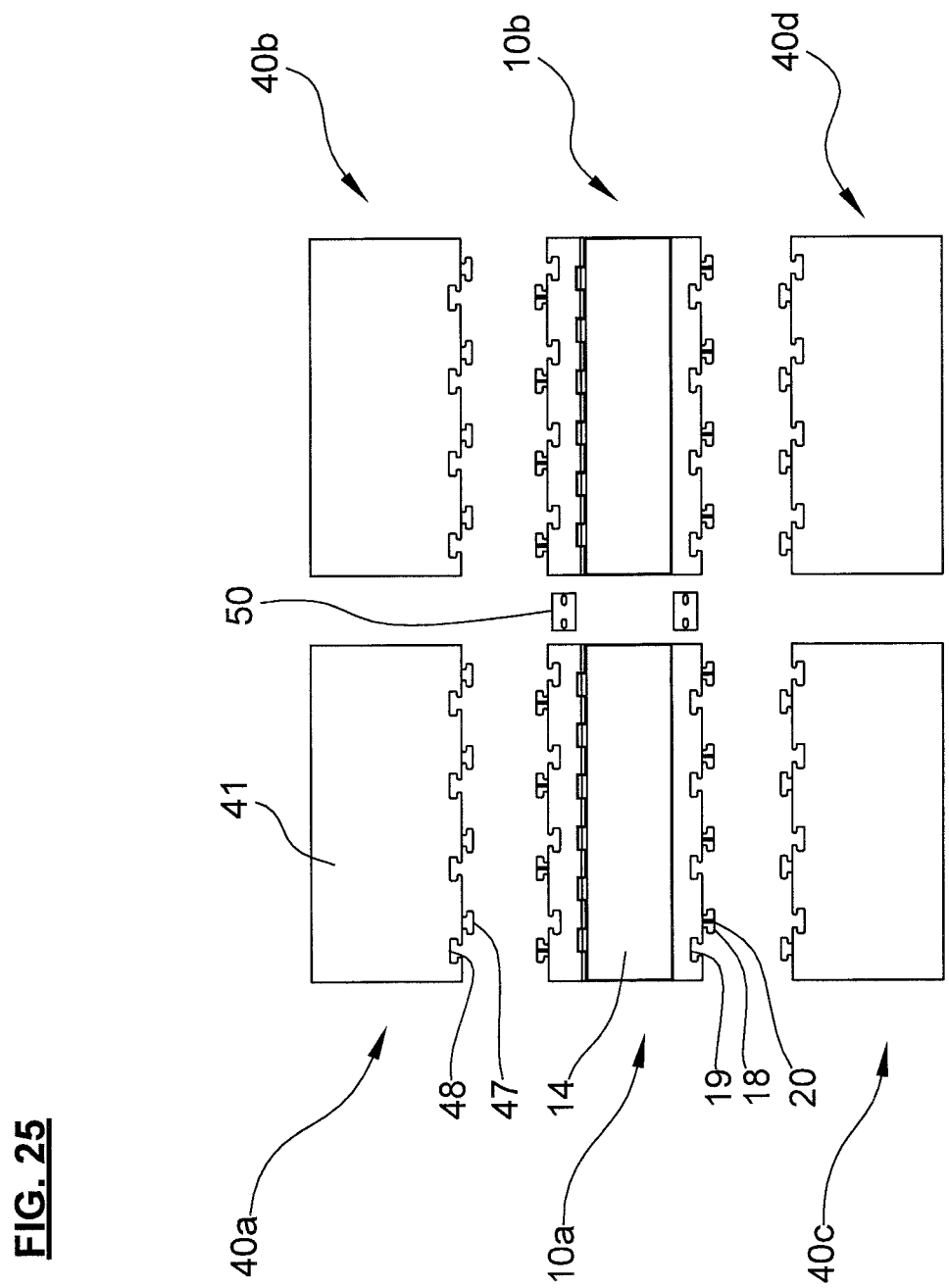

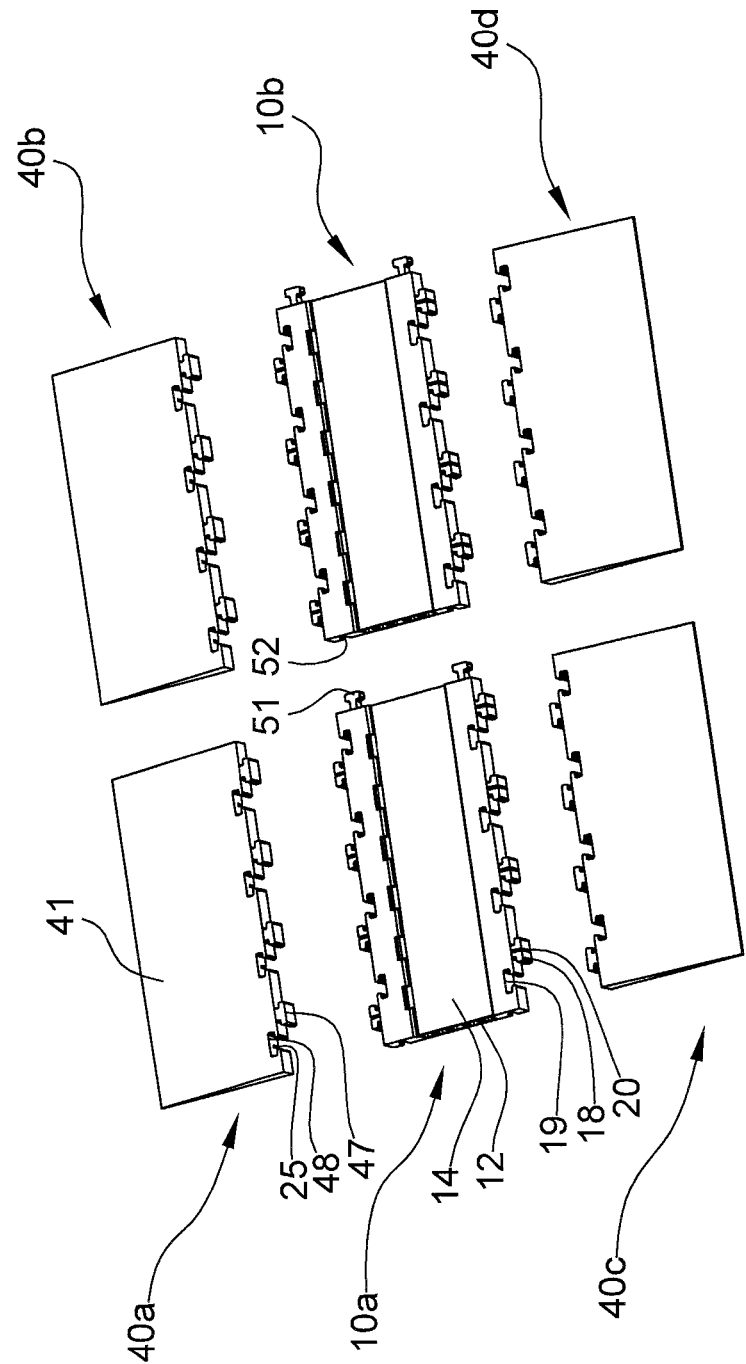

DISCONNECT SYSTEM FOR MODULAR CABLE PROTECTORS

RELATED APPLICATION

The present application is a continuation-in-part of the Applicant's co-pending U.S. patent application Ser. No. 16/549,319, entitled "Disconnect System for an Auxiliary Side Ramp for a Modular Cable Protector," filed on Aug. 23, 2019, which is based on and claims priority to the U.S. Provisional Patent Application 62/732,147, entitled "Disconnect System for an Auxiliary Side Ramp for a Modular Cable Protector," filed on Sep. 17, 2018.

BACKGROUND OF THE INVENTION

Field of the Invention

The present invention relates generally to the field of modular cable protectors. More specifically, the present invention discloses a disconnect system for modular cable protectors that include tool engagement features to facilitate disassembly using a hand tool.

Statement of the Problem

Modular cable protectors have been used for many years to protect cables, hoses and wiring from vehicular traffic and to minimize trip hazards for pedestrians. Cable protectors are frequently used at public events, such as concerts and sports events. Cable protectors are also used in factories, warehouses, mines, and other situations where temporary cables, hoses and the like are deployed.

U.S. Design Pat. No. 412,490 (Henry) shows an example of a modular cable protector that has been widely used in the industry. As shown in the Henry design patent, a modular cable protector typically includes parallel recessed channels extending between the ends of the cable protector for carrying cables, hoses, wiring or the like. Two opposing side ramps guide traffic over the cable protector. Complementary sets of end connectors at the ends of the cable protector enable multiple cable protectors to be connected in series. For example, the cable protector shown in the Henry design patent include complementary sets of male and female end connectors that are generally T-shaped. Several other end connector shapes are also commonly used. Some cable protectors employ removable end connectors that engage voids or recesses in the bottoms or ends of adjacent cable protectors. A lid covers the channels and forms the top surface of the cable protector when the lid is closed. The lid pivots about a hinge running along one side so that the lid can be raised to provide access to the channels. These cable protectors can be strung together in series to any desired length by engaging the complementary male and female end connectors at the ends of the cable protectors.

As previously mentioned, most cable protectors are equipped with opposing side ramps. The angle of inclination of these side ramps is sufficiently low to facilitate normal foot and vehicular traffic, and to reduce the risk of the cable protector being a trip hazard to pedestrians. The Henry design patent shows a cable protector in which opposing side ramps that are molded as a single piece with the main body of the cable protector. However, the prior art in this field also includes cable protectors with detachable side ramps, as shown for example in U.S. Pat. No. 5,777,266 (Herman et al.). In these embodiments, the center section of the cable protector is generally an elongated rectangular trough covered by a hinged lid, that can be divided into a plurality of parallel channels for carrying cables between the ends of the cable protector (see, FIG. 2 of the Herman patent).

Side ramps can be removably attached to the sides of the center section by means of edge connectors. For example, these edge connectors can be complementary sets of male and female T-shaped connectors formed in the adjacent side walls of the center section and side ramp, or the edge connectors can be removable clips with upward protrusions that engage corresponding recesses in the bottoms of the center section and side ramp adjacent to their adjacent side walls. Other shapes and configurations could be readily substituted.

As previously mentioned, a series of modular cable protectors are often deployed at a venue with a plurality of center sections 10a-10b aligned in an end-to-end configuration, similar to that shown in FIGS. 1 and 2. Opposing pairs of side ramps 40a-40d are removably attached by means of edge connectors 18, 48 to the sides of the center sections 10a-10b, as shown in FIG. 2 to facilitate cross-over traffic and ensure tight side-by-side connections. The ends of the side ramps 40a-40d can also be removably attached to the ends of adjacent side ramps by means of end connectors 50 to ensure tight end-to-end connections between adjacent side ramps 40a-40b and 40c-40d.

The problem is that disassembling these center sections 10a-10b and side ramps 40a-40d can be very labor intensive, particularly if many of these components are used at a venue. A worker must stoop down at each side ramp and place his fingers under its edges to exert an upward force to separate it from the center section of the cable protector and disengage its edge connectors. Similar difficulties can also be encountered when disassembling adjacent side ramps. Here again, the end connectors between adjacent side ramps can be difficult to release.

It should also be noted that center sections and side ramps are relatively large and awkward for one person to lift. When separating a side ramp from a center section or separating two adjacent side ramps, their edge connectors and end connectors may tend to bind another unless the side ramp is removed with a purely vertical movement. But, the extended length of the side ramp makes it difficult to lift the side ramp straight upward without exerting a torque on the edge or end connectors. Therefore, a need exists for a means to facilitate disassembly using a vertical movement to minimize binding.

Solution to the Problem

The present invention simplifies disassembly of the center sections and side ramps by providing tool engagement features on the side ramps or center sections that can be removably engaged by a hand tool. This enables the cable protectors to be quickly and easily disassembled. It also helps to ensure that the side ramps are lifted upward in a substantially vertical direction to minimize binding of their edge connectors and end connectors.

For example, the tool engagement features can be a set of openings (e.g., vertical slots or recesses) extending downward from the top of the side ramp or center section adjacent to the edge connectors. The bottom of each opening is equipped with a horizontal undercut or lip within the side ramp or center section. The worker can insert a tool into the openings to engage these undercuts and then exert an upward force to disengage the edge connectors, and thereby disassemble the side ramp from the center section. For example, the tool can be equipped with two vertical rods that fit into the openings with horizontal protrusions at the bottom of the rods to engage the undercuts. These openings can be placed in a variety of locations (e.g., on the male edge connectors, near the head of the female edge connectors, or near the edge of the side ramp adjacent to the edge connectors).

SUMMARY OF THE INVENTION

This invention provides a disconnect system for modular cable protectors that includes tool engagement features to facilitate disassembly of side ramps from the center sections of the cable protectors using a hand tool. The tool is used to removably engage these tool engagement features to enable the user to exert an upward force to disengage the edge connectors and end connectors on the side ramps and center section of each cable protector. For example, the tool engagement features can be openings (e.g., vertical slots or recesses) in the top surface of the side ramp with undercuts adjacent to the lower ends of the openings. A tool with vertical rods is manually inserted into the openings to disengage the side ramps. Horizontal projections at the bottom of the vertical rods engage the undercuts and allow the user to disengage the side ramps by lifting upward on the tool.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3 is a top view of a center section 10.

FIG. 4 is a right side view of the center section 10.

FIG. 5 is a bottom axonometric view of the center section 10.

FIG. 6 is a top view of a side ramp 40.

FIG. 7 is a right side view of the side ramp 40 corresponding to FIG. 6.

FIG. 8 is a bottom axonometric view of the side ramp 40 corresponding to FIGS. 6 and 7.

FIG. 19 is a detail vertical cross-sectional view corresponding to FIG. 18 showing the tool 30 inserted into an opening 20 and undercut 25 in a side ramp 40a.

FIG. 22 is a detail vertical cross-sectional view corresponding to FIG. 21 showing the tool 30 inserted into an opening 20 and undercut 25 in a side ramp 40a.

FIG. 24 is a top view showing two center sections 10a, 10b with male and female edge connectors 18, 19 for removably engaging side ramps 40a-40d, and male and female end connectors 51, 52 for removably engaging the center sections 10a, 10b.

FIG. 25 is a top view showing two center sections 10a, 10b with alternating patterns of male and female edge connectors 18, 19 for removably engaging corresponding male and female edge connectors 47, 48 on the side ramps 40a-40d, and also having bottom connectors 50 that seat in corresponding recesses in the bottoms of center sections 10a, 10b to serve as end connectors.

FIG. 26 is a top axonometric view showing two center sections 10a, 10b with hidden male and female end connectors 52, 52.

DETAILED DESCRIPTION OF THE INVENTION

The present invention provides a disconnect system to simplify disassembly of modular cable protectors. Each modular cable protector includes a center section 10 and number of opposing, removable side ramps 40 that can be easily detached from the lateral edges of the center section 10 using a tool 30. The modular cable protectors can be connected in series (i.e., end to end) to any desired length. A string of such cable protectors can also be easily disassembled using the same tool 30 in the present invention.

FIGS. 3-5 show an example of the center section 10 of a modular cable protector. The center section 10 is generally an elongated trough with a substantially rectangular cross-section and an open top. A number of parallel channels 12 extend between its opposing ends for carrying cables, hoses, wiring or the like. The bottom of the center section 10 may also include a number of voids or recesses.

Figure 2:
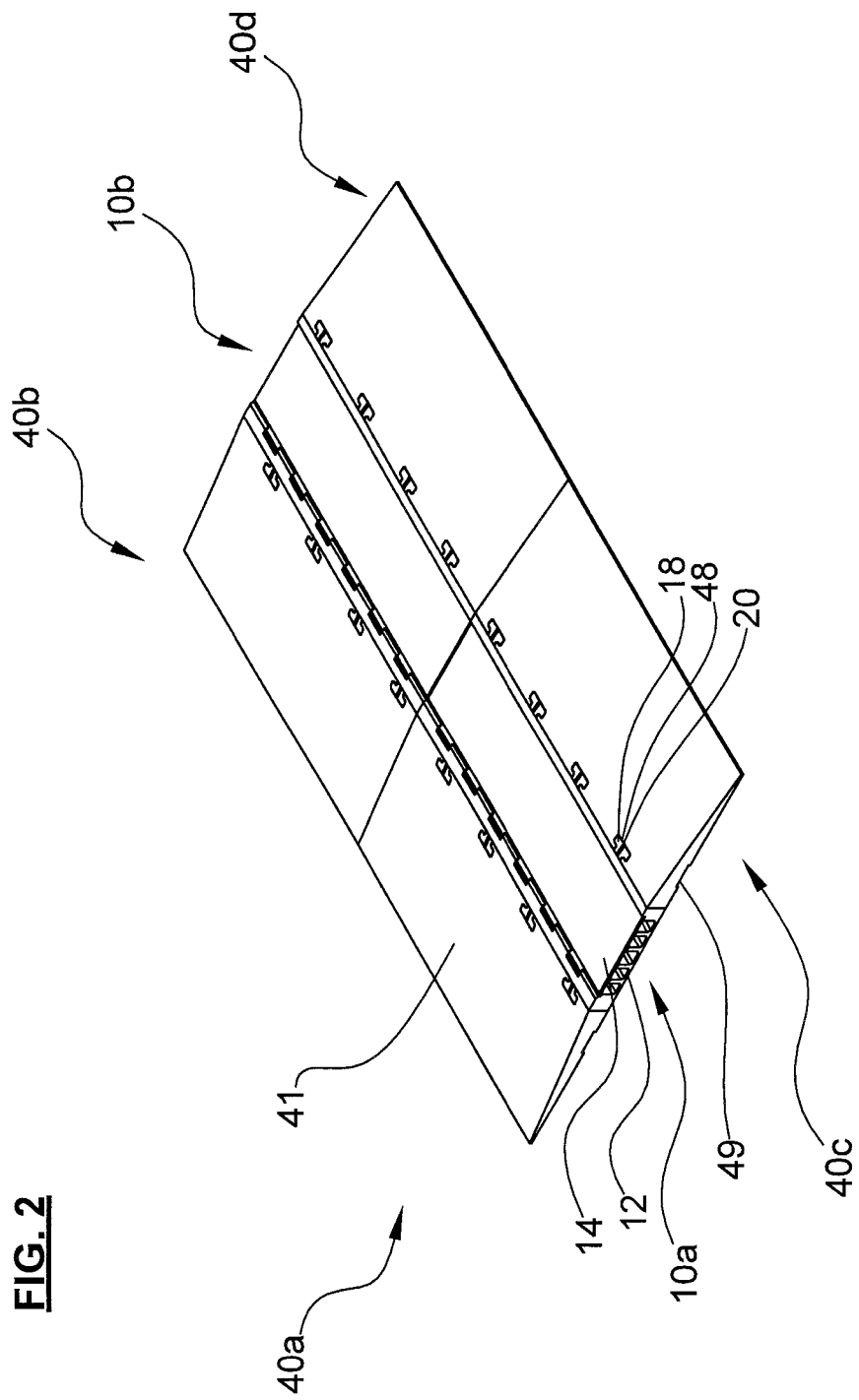
FIG. 2 is a top axonometric view corresponding to FIG. 1 after assembly of the center sections 10a, 10b and side ramps 40a-40d.
Figure 10:
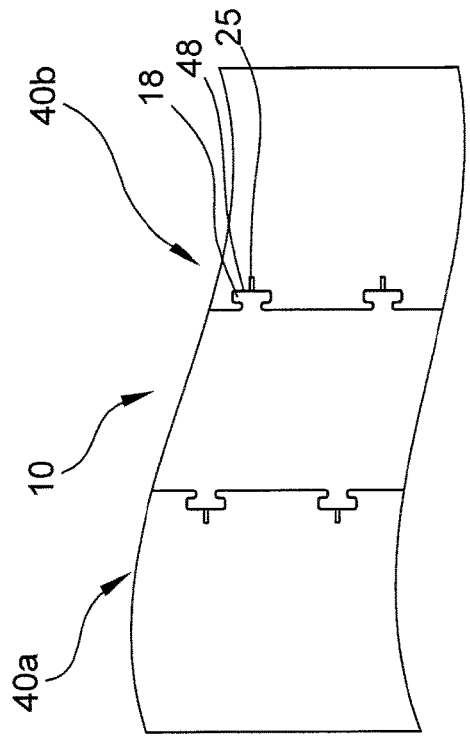
FIG. 10 is a detail bottom view corresponding to FIG. 9.
Figure 9:
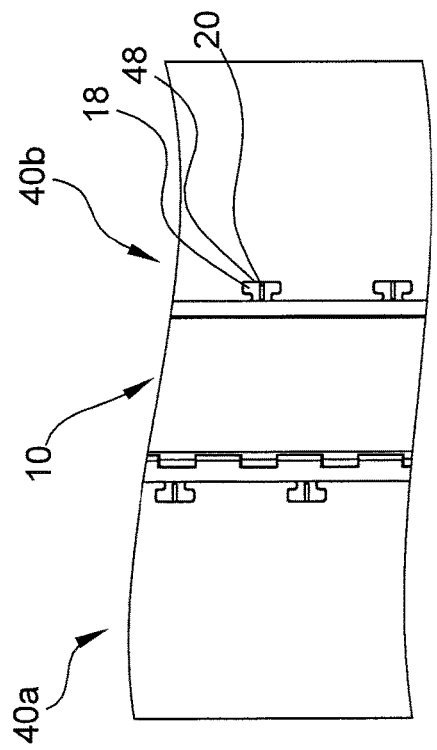
FIG. 9 is a detail top view showing the edge connectors 18, 48 between a side ramp 40 and the center section 10, corresponding to FIG. 2.

A lid 14 covers the channels 12 and forms at least a portion of the top surface of the center section 10 when the lid 14 is closed as illustrated in FIG. 2. The lid 14 can be pivoted about its hinge to an open position to allow access to the channels 12.

Figure 1:
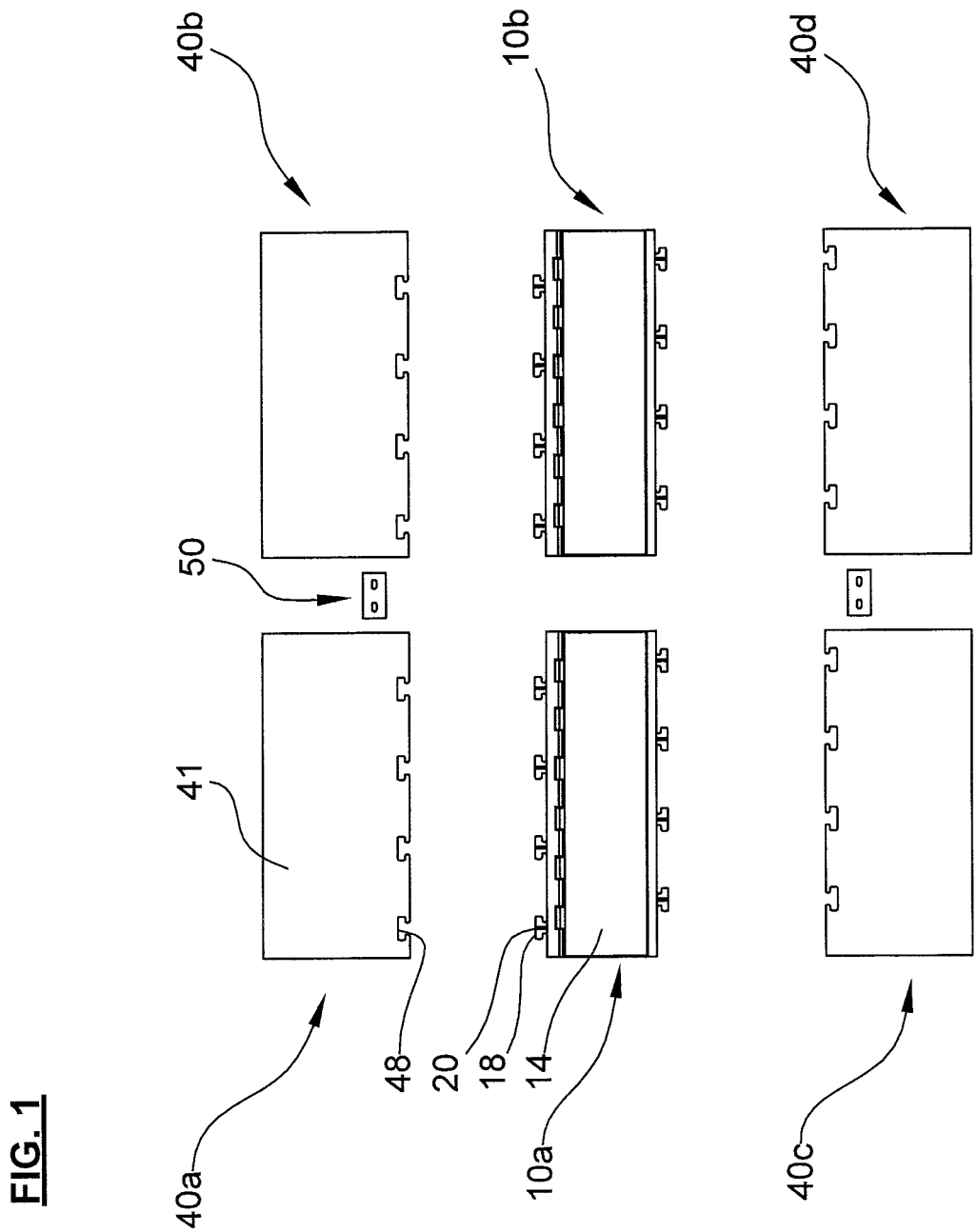
FIG. 1 is a top view of two center sections 10a, 10b and four side ramps 40a-40d before assembly.

End connectors 50 at the ends of the center sections 10*a*, 10*b* or side ramps 40*a*-40*d* enable multiple cable protectors to be connected in series with the channels 12 of the center sections 10*a*, 10*b* in alignment as shown in FIGS. 1 and 2. The preferred embodiment of the present invention employs small removable connectors 50 with upwardly-extending protrusions that removably seat into corresponding voids or recesses 49 in the bottoms of adjacent side ramps 40*a*-40*d* or center sections 10*a*, 10*b*.

An alternative embodiment employs complementary sets of T-shaped male and female end connectors at the ends of the cable protectors. However, other shapes and configurations could be readily substituted for the end connectors. The use of such end connectors is discussed in greater detail in the applicant's U.S. Pat. Nos. 10,396,539 and 10,522,993 (Henry), which are hereby incorporated by reference into this disclosure.

Returning to FIGS. 1 and 2, two opposing removable side ramps 40*a*, 40*c* and 40*b*, 40*d* can be removably attached to the lateral edges of the center sections 10*a*, 10*b* by means of edge connectors 18, 48 to guide traffic over the cable protectors. FIGS. 6-8 show one embodiment of a side ramp 40 that can be removably secured to the lateral edge of a center section 10. The vertical cross-section of the side ramp 40 generally forms a right triangle. When assembled, the side ramp 40 has a sloped top surface 41 with a lateral edge abutting the lateral edge of the center section 10 to facilitate pedestrian or wheelchair access over the cable protector. The top surface 41 of the side ramp 40 is substantially planar and extends upward from the ground along its distal edge to the elevation of the lid 14 along its proximal edge to form a ramp for the center section 10. The base 42 of the side ramp 40 can be substantially flat to lay in contact with the ground. The base 42 can include a number of voids 49 to engage the end connectors 50, and to serve as handgrips and save material weight and cost.

The edge connectors 18, 48 are analogous to the end connectors 50, discussed above, that removably attached adjacent cable protectors. However, the edge connectors 18, 48 removably connect the side ramps 40 to the center section 10 of the cable protector. In the preferred embodiment of the present invention, these edge connectors are complementary sets of male and female connectors 18 and 48 on the lateral sides of the center section 10 and side ramp 40, respectively. Alternatively, the voids 49 in the base 42 of each side ramp 40 can be used to removably receive bottom connectors 50 (i.e., essentially the same as the end connectors) that span between voids 49 in the bottom of the side ramp 40 and corresponding voids in the bottom of the center section 10 of the cable protector to thereby removably secure the side ramps 40 to the center section 10.

Figure 11:
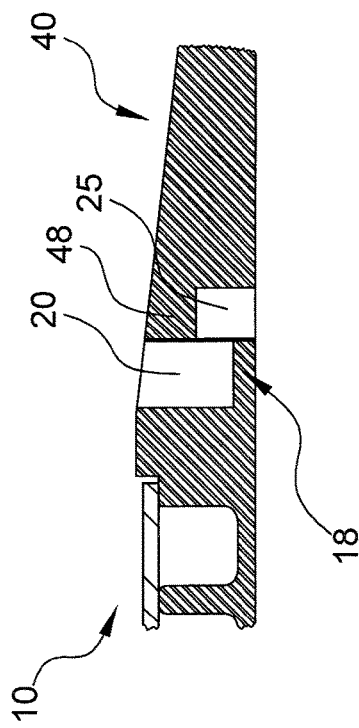
FIG. 11 is a detail vertical cross-sectional view of the edge connectors 18, 48 of the side ramps 40a and 40b, corresponding to FIGS. 9 and 10.

The side ramp 40 or center section 10 includes a number of tool engagement features for removably engaging a tool 30, as will be discussed in greater detail below. In the embodiment shown in FIGS. 1, 2 and 6-11, the tool engagement features are openings 20 (e.g., vertical slots or recesses) that extend downward from the top surface of the side ramp 40 adjacent to the edge connectors 18, 48. Each opening 20 has at least one undercut 25 extending horizontally from the lower end of the opening 20, as shown in FIG. 11.

Figure 12:
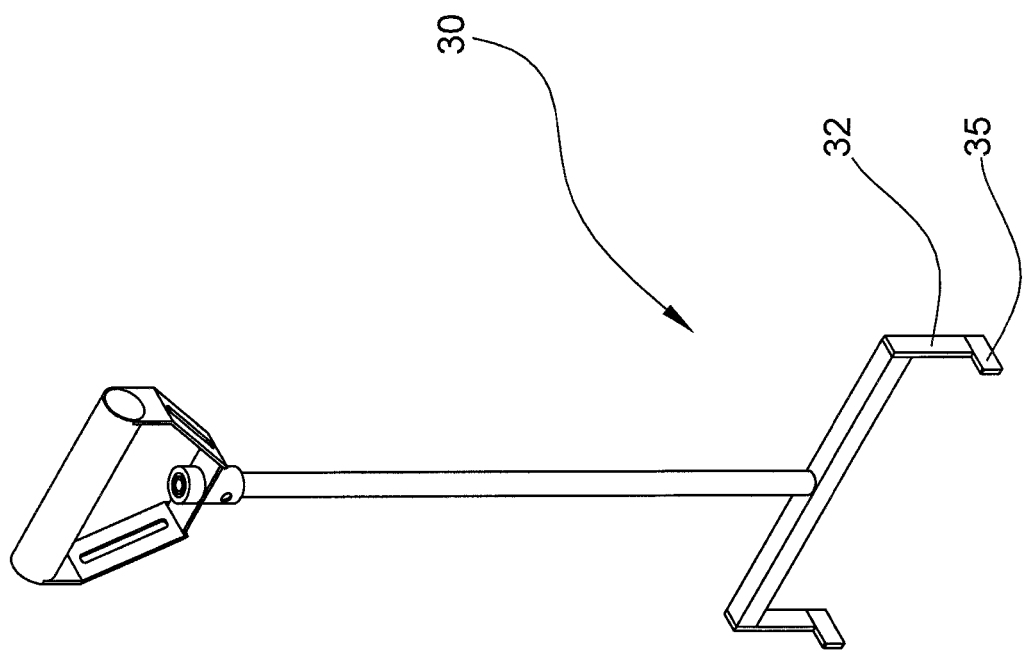
FIG. 12 is an axonometric view of the tool 30 used to disengage the side ramps 40a-40d.
Figure 13:
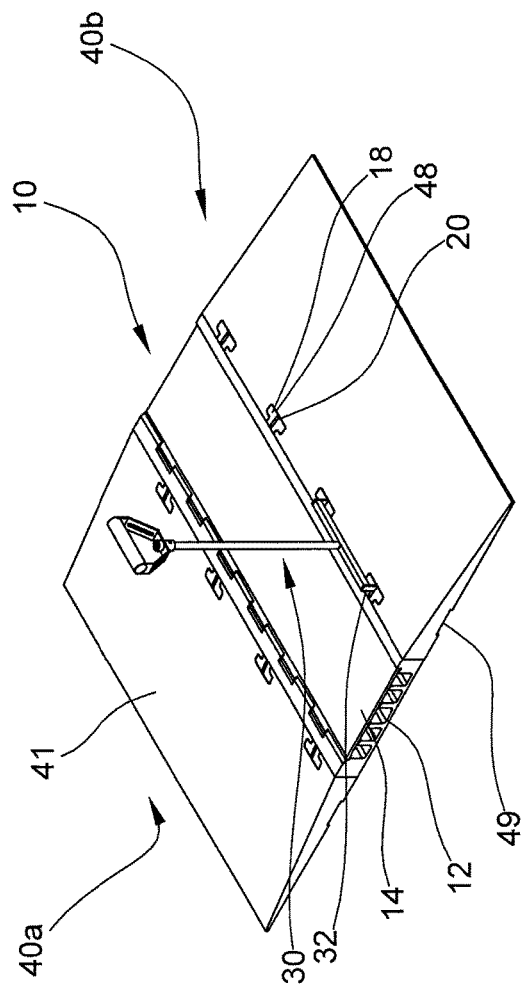
FIG. 13 is a top axonometric view corresponding to FIG. 2, showing the assembled side ramps 40a-40b with the tool 30 inserted in two openings 20.
Figure 14:
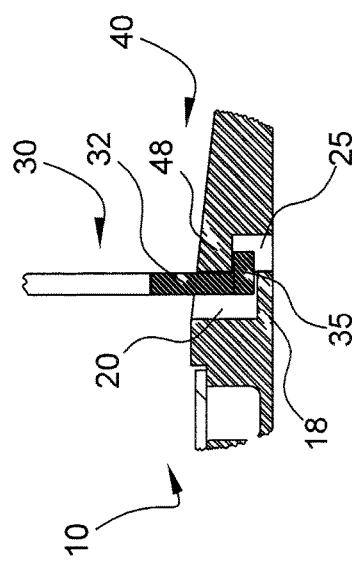
FIG. 14 is a detail vertical cross-sectional view of the edge connectors 18, 48 after insertion of the tool 30, corresponding to FIG. 13.

FIG. 12 illustrates one possible embodiment of a tool 30 used to engage the openings 20 and undercuts 25 for the purpose of disconnecting the side ramps 40 from the center section 10. This tool 30 has two vertical rods 32 designed to be inserted into corresponding openings 20 in the top of a side ramp 40. Horizontal protrusions 35 at the lower ends of the vertical rods 32 removably engage the undercuts 25 in the side ramp as depicted in FIG. 14. The user initially inserts the rods 32 of the tool 30 vertically downward into the openings 20 in the top of the side ramp 40. The horizontal protrusions 35 can be made to engage the undercuts 25 either by slightly pivoting the upper end of the tool 30, or shifting the entire tool 30 slightly forward in the openings 20 toward the undercuts 25, so that the horizontal protrusions 35 extend into, and are caught under the undercuts 25. The user then exerts an upward force on the tool 30 to lift the side ramp 40 and disconnect its edge connectors 48 from those of the center section 10.

It should be noted that the size, shape and proportions of these openings 20 and undercuts 25 are largely a matter of design choice. It should also be understood that the terms "opening", "slot" and "undercut" should be broadly construed. A relatively narrow slot offers the advantages of being visually unobtrusive, minimizing the risk of being a trip hazard, and reducing the risk of the slot becoming obstructed with dirt or debris. However, the openings 20 could have a wide range of shapes, dimensions and proportions. For example, the slots 20 could be rectangular, square, circular, tapered or oval. Also, the slots 20 can have any desired orientation with respect to the side ramp 40 or center section 10. Similarly, the undercuts 25 can have any desired shape, dimensions and proportions. Optionally, the openings 20 can be provided with multiple undercuts 25 allowing the tool 30 to be inserted in more than one orientation. For example, the openings 20 could be a round hole or recess with an annular peripheral undercut extending outward about the lower end of the hole.

Figure 15:
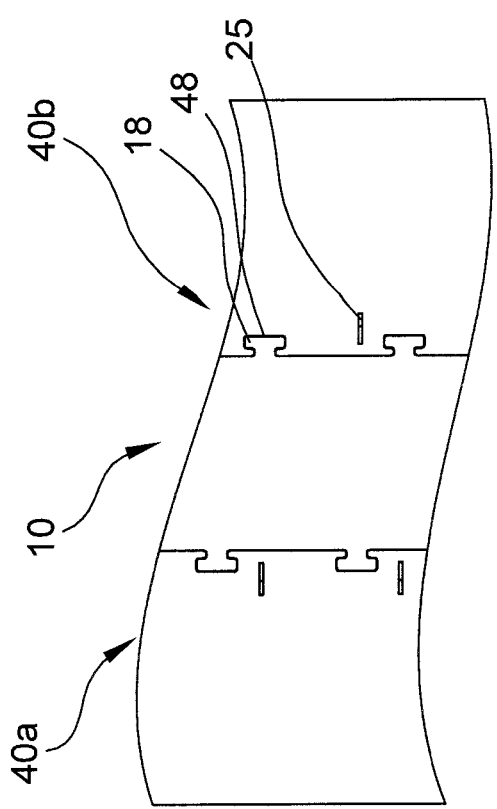
FIG. 15 is a detail top view of two assembled side ramps 40a-40b in another embodiment of the present invention in which the openings 20 are located near the female edge connectors 48 on the side ramps 40a-40b.
Figure 16:
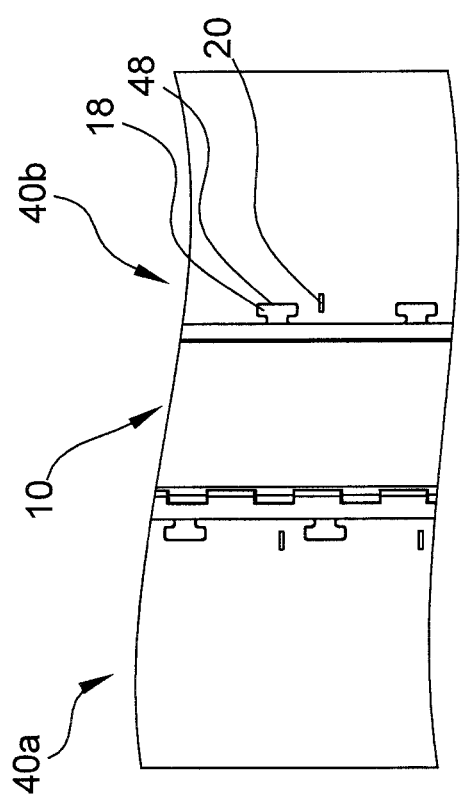
FIG. 16 is a detail bottom view corresponding to FIG. 15.
Figure 17:
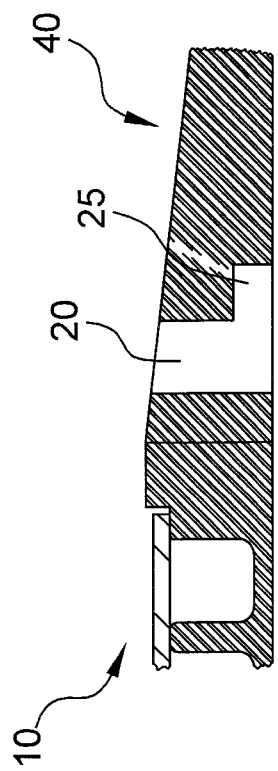
FIG. 17 is a detail vertical cross-sectional view corresponding to FIGS. 15 and 16.

The locations of the openings 20 and undercuts 25 on the side ramps 40 or center section 10 are also largely a matter of design choice. As previously discussed, FIGS. 1-2 show openings 20 in the male edge connectors 18 on the lateral edges of the center section 10 of the cable protector. The undercuts 25 extend into the head of the corresponding female edge connectors 48 on the side ramps 40. In contrast, FIGS. 15-17 show openings 20 with undercuts 25 adjacent to the female edge connectors 48 on the side ramps 40. Alternatively, the openings 20 could be located near the edge of the side ramp 40 adjacent to the center section 10.

Figure 27:
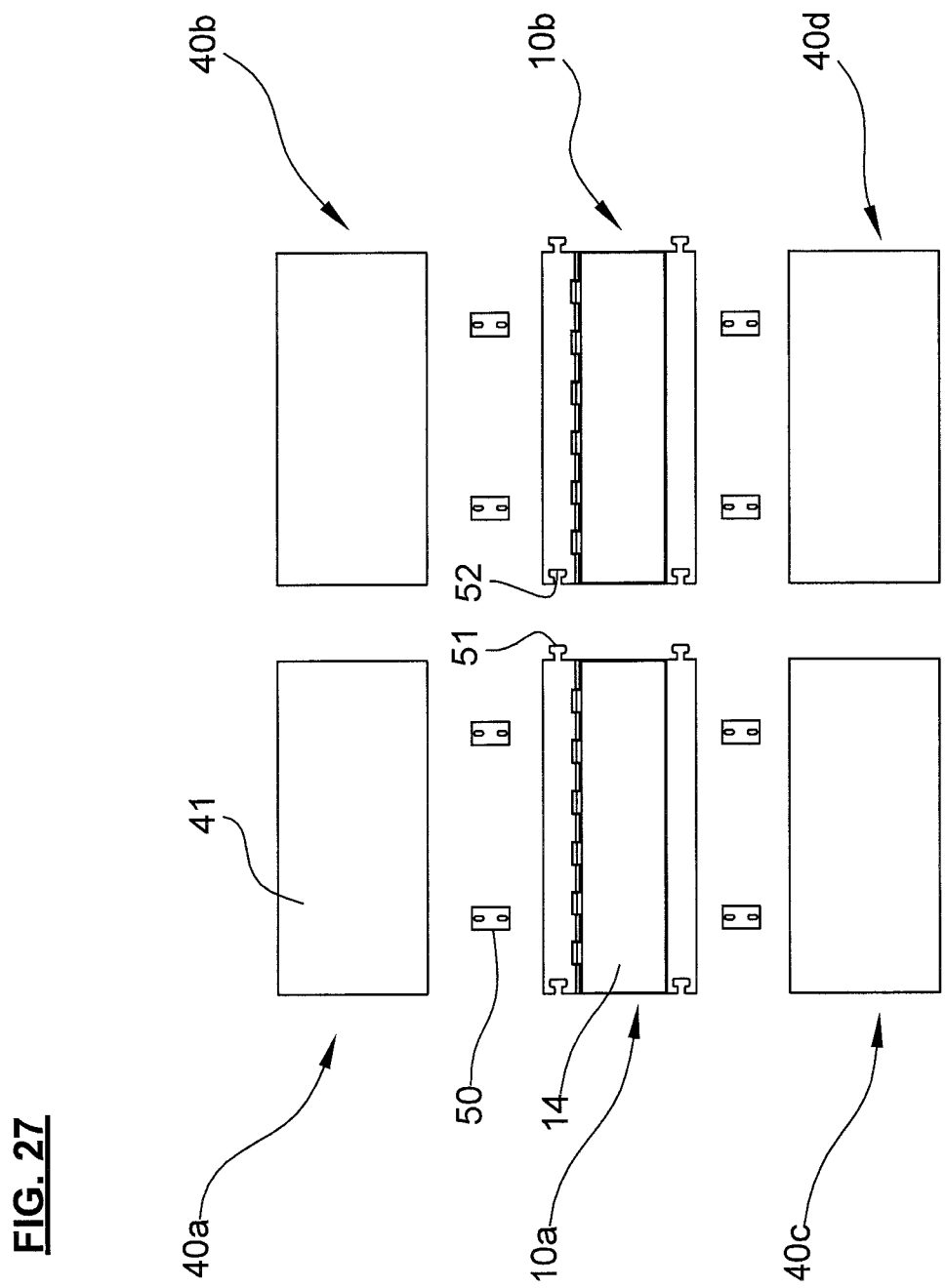
FIG. 27 is a top view showing a set of bottom connectors 50 that seat in corresponding recesses in the bottoms of the center sections 10a, 10b and side ramps 40a-40d to serve as edge connectors.

Here again, the edge connectors 18, 48 can have can be designed to have any number of complementary shapes, sizes and configurations. For example, the edge connectors 18, 48 can be generally T-shaped, similar to the end connectors 50 described above. FIGS. 24-26 show embodiments in which the center section 10 and side ramps 40 have alternating patterns of male and female edge connectors 18, 28. Bottom connectors 50 that fit into corresponding recesses 49 in the bottoms of the center section 10 and side ramps 40 could also be employed, as shown in FIG. 27.

In another related embodiment, the openings 20 extend up to the head of the female edge connectors 48 of each side ramp, and the corresponding undercuts extend into the male edge connectors 18 of the center section 10. Similarly, the relative positions of the male and female edge connectors 18, 48 could be reversed on the center section 10 and side ramp 40. The openings 20 and undercuts 25 could also be placed in areas of the side ramp 40 further from the edge connectors 18, 48, although these configurations might make it more difficult to disengage the edge connectors 18, 48 due to torsion created by exerting a vertical upward force on the tool 30 at a distance from the edge connectors 18, 48.

A wide variety of alternative embodiments of the tool engagement features are possible beyond those shown in the drawings. For example, the undercut in the tool engagement feature could take the form of a pin extending across the slot in the cable protector. Alternatively, raised tool engagement features can be located on the top surfaces of the cable protector, such as the edge connectors. In this embodiment, the tool has horizontal projections that are inserted through these raised features to disengage the side ramps. Eyebolts or recessed hooks could also be used as the tool engagement features. For example, these tool engagement features can be mounted in recesses in the side ramps or embedded in the top surface of the side ramp.

Threaded inserts can also be used as the tool engagement features. For example, these threaded inserts can extend into the male edge connectors. In this embodiment, the tool has a threaded lower end that can be threaded into the threaded inserts by a quick twisting motion (e.g., a quarter turn) to removably engage the tool to the side ramp.

Finally, the tool engagement features can take the form of holes in the top surface of the side ramp or center section. Here, the lower ends of the tool are slightly larger than the holes to engage these holes by a friction fit. The lower ends of the tool are initially pushed the holes to establish a connection. The user can then lift upward on tool to disengage the edge connectors and disconnect the side ramp. Frictional engagement between the tool and holes can be maximized by lifting upward on the tool with a slightly off-vertical force vector.

Figure 18:
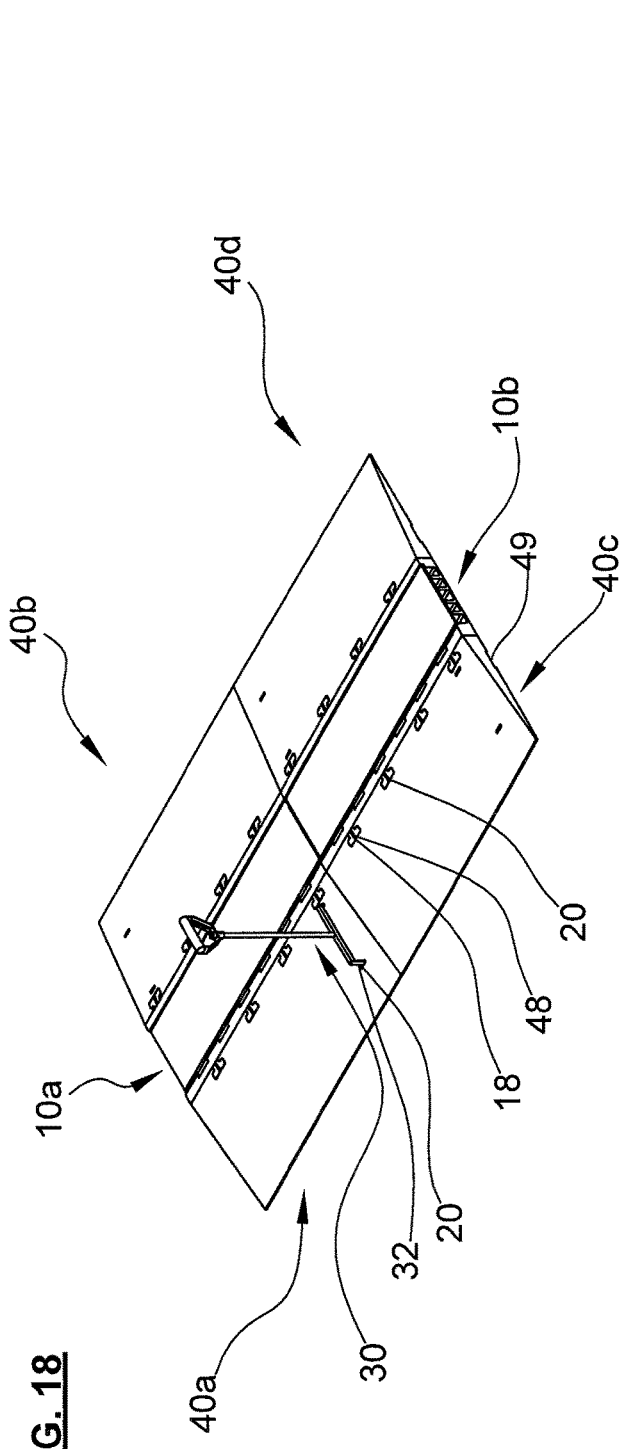
FIG. 18 is a top axonometric view of side ramps 40a-40d with end connectors 50 being disassembled by a tool 30.
Figure 20:
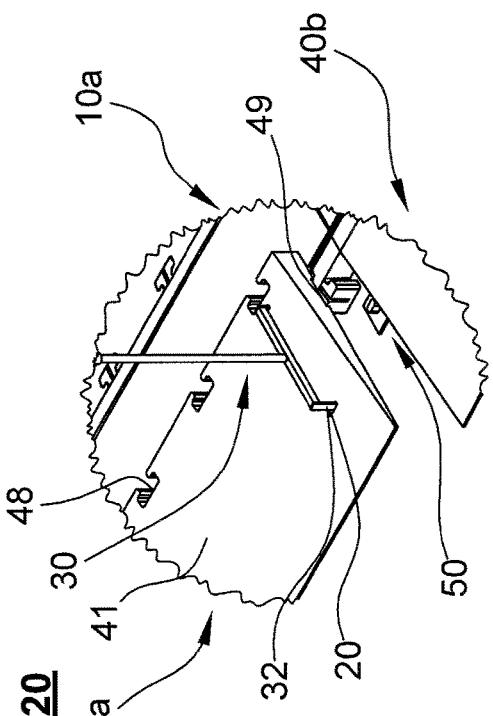
FIG. 20 is a detail axonometric view corresponding to FIGS. 18-19 showing the side ramps 40a, 40b after the end connectors 50 have been disengaged.
Figure 19:
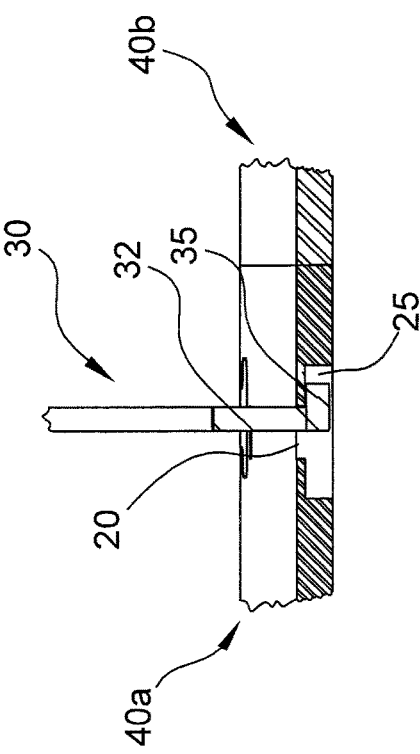

FIGS. 18-20 illustrate that the tool 30 can also be used to disassemble the end connectors 50, similar to the way in which the edge connectors 18, 48 are disassembled. Here again, tool engagement features consisting of openings and undercuts are formed adjacent to the end connectors 50 or adjacent to the ends of the center section 10 or side ramps 40 as shown in FIGS. 18-20. The tool 30 can then be inserted into the tool engagement features and used to exert an upward force to disengage the end connectors 50.

Figure 21:
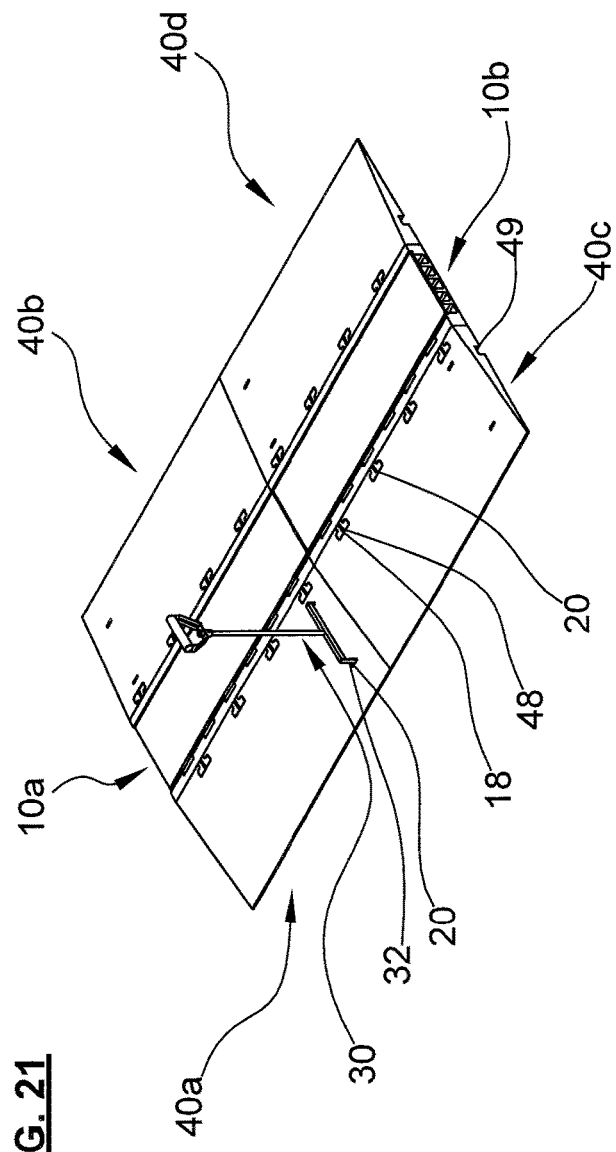
FIG. 21 is a top axonometric view of side ramps 40a-40d with hidden end connectors 50 being disassembled by a tool 30.
Figure 23:
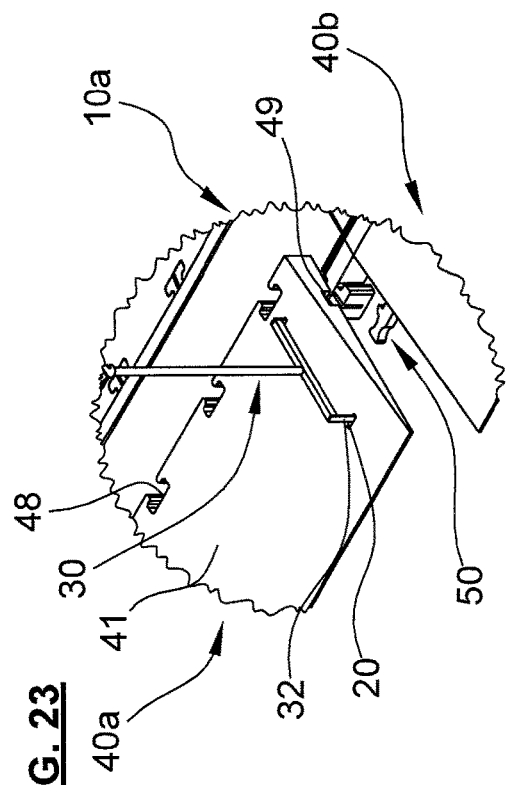
FIG. 23 is a detail axonometric view corresponding to FIGS. 21-22 showing the side ramps 40a, 40b after the hidden end connectors 50 have been disengaged.
Figure 22:
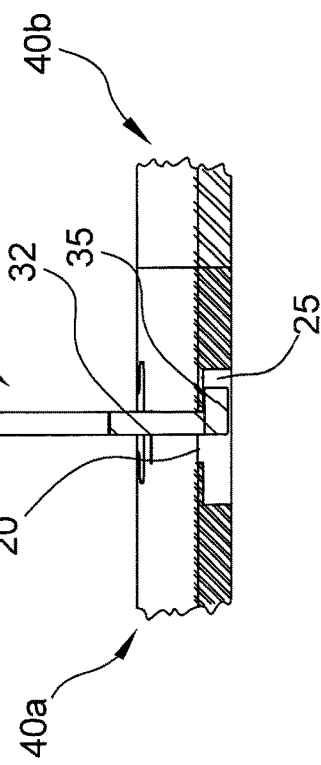

Another embodiment of the present invention, shown in FIGS. 21-23 and 26, employs "hidden" end connectors having male end connectors 50 with a reduced height that seat in corresponding voids or recesses 49 that serve as female end connectors in the bottom of an adjacent cable protector. However, the end connectors 50 do not extend to the top surface of the adjacent cable protector. In this configuration, both the male end connectors 50 and recesses 49 are concealed when the cable protectors are connected in series. FIG. 25 shows another variation in which a bottom connector seats in recesses in the bottoms of adjacent cable protectors and serves as a hidden end connector 50. Similar to the previous embodiment, tool engagement features consisting of openings 20 and undercuts 25 are formed adjacent to the hidden end connectors 50 near the ends of the side ramps 40 as shown in FIGS. 21-23. The tool 30 can then be inserted into the tool engagement features and used to exert an upward force to disengage the end connectors 50, as illustrated in FIG. 23.

Figure 28:
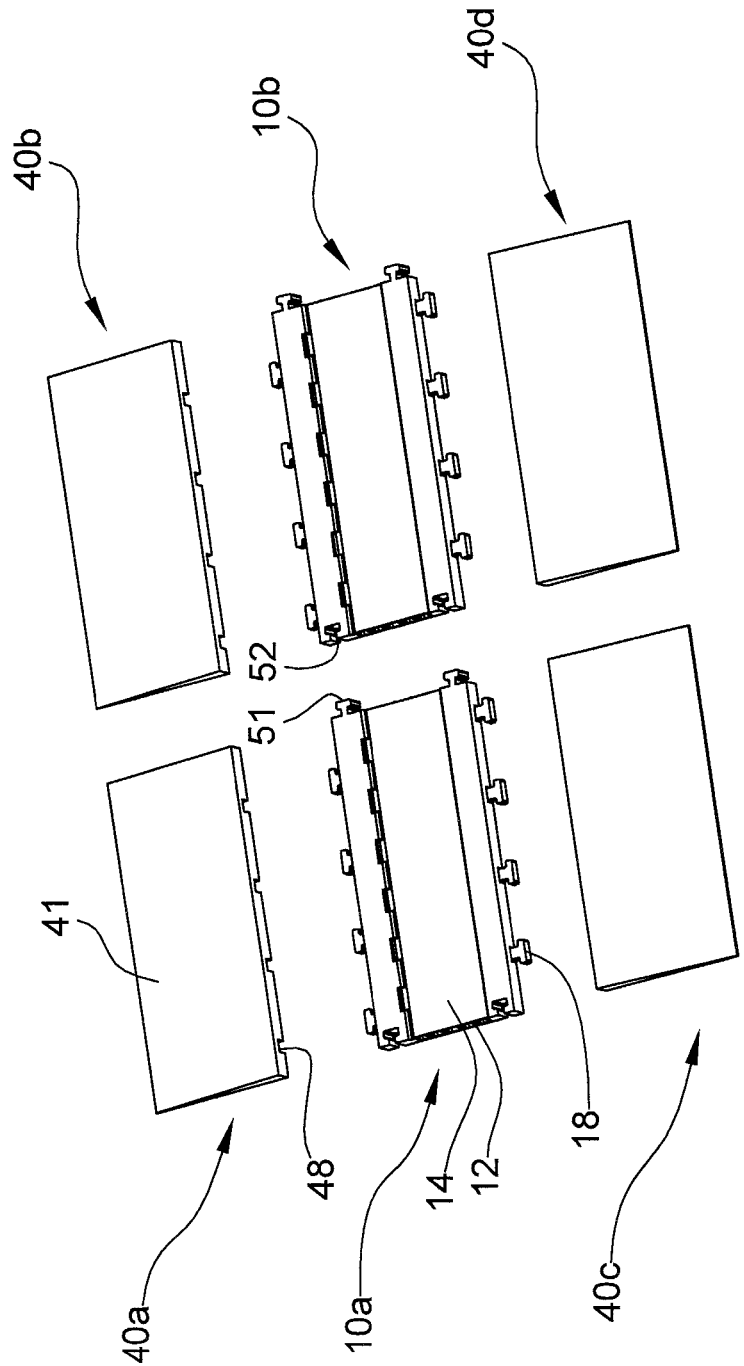
FIG. 28 is a top axonometric view showing two center sections 10a, 10b with hidden male edge connectors 18 that removably engage corresponding female edge connectors 48 on the side ramps 40a-40d.

Similarly, the edge connectors 18, 48 can be hidden under the side ramps 40, similar to the end connectors previously discussed. FIG. 28 shows an embodiment of the present invention that employs hidden edge connectors to removably connect the lateral edges of the side ramps 40 to each center section 10. In this embodiment, the male edge connectors 18 extending from lateral edges of the center section 10 have a reduced height and seat in corresponding voids or recesses in the bottom of the side ramp 40 that serve as female edge connectors 48. These hidden edge connectors 18, 48 do not extend to the top surface of the side ramps 40. Thus, both the male and female edge connectors 18, 48 are concealed when the side ramps 40 are connected to the center section 10. FIG. 27 shows another variation in which a bottom connector seats in recesses in the bottoms of the center section 10 and side ramp 40, respectively, and serves as a hidden edge connector 50.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A modular cable protector for use with a tool, said modular cable protector comprising:
   a center section having opposing ends, at least one lateral edge, at least one channel extending in parallel between the ends for receiving cables, and a top lid providing access to the channels;
   at least one side ramp for removably attachment to an edge of the center section, each side ramp having a base, opposing ends, a lateral edge, and a sloped top surface forming a ramp to the center section;
   complementary sets of edge connectors on the center section and side ramp for removably attaching the side ramp to the center section with the edge of the side ramp abutting the edge of the center section;
   complementary sets of end connectors on the ends of the side ramp or center section for removably connecting a plurality of like cable protectors in series with the channels in alignment with the channels of adjacent cable protectors; and
   a tool engagement feature in the top surface of the side ramp or the center section for removably engaging a tool to enable an upward force on the tool to be exerted on the tool engagement feature, to thereby disengage the edge connectors and detach the side ramp from the center section.

2. The modular cable protector of claim 1 wherein edge connectors comprise complementary sets of male and female edge connectors on the lateral edges of the side ramp and center section.

3. The modular cable protector of claim 2 wherein the tool engagement feature is adjacent to an edge connector of the side ramp.

4. The modular cable protector of claim 2 wherein the tool engagement feature is on a male edge connector.

5. The modular cable protector of claim 2 wherein the tool engagement feature is adjacent to a female edge connector.

6. The modular cable protector of claim 2 wherein the tool has a vertical member and a horizontal protrusion extending from the lower end of the vertical member, and wherein the tool engagement feature further comprises:
   a substantially vertical slot in a male edge connector for removably receiving the vertical member of a tool; and
   an undercut extending horizontally from the slot into the adjacent female edge connector for removably engaging the horizontal protrusion of a tool.

7. The modular cable protector of claim 1 wherein the tool has a vertical member and a horizontal protrusion extending from the lower end of the vertical member, and wherein the tool engagement feature further comprises:
   an opening in the top surface of the side ramp for removably receiving the vertical member of a tool; and
   an undercut extending horizontally from the opening within the side ramp for removably engaging the horizontal protrusion of a tool.

8. A modular cable protector for use with a tool having a vertical member and a horizontal protrusion extending from the lower end of the vertical member, said modular cable protector comprising:
- a center section having opposing ends, at least one lateral edge, at least one channel extending in parallel between the ends for receiving cables, and a top lid providing access to the channels;
- at least one side ramp for removably attachment to an edge of the center section, each side ramp having a base, opposing ends, a lateral edge, and a sloped top surface forming a ramp to the center section;
- complementary sets of edge connectors on the center section and side ramp for removably attaching the side ramp to the center section with the edge of the side ramp abutting the edge of the center section;
- complementary sets of end connectors on the ends of the side ramp or center section for removably connecting a plurality of like cable protectors in series with the channels in alignment with the channels of adjacent cable protectors; and
- a tool engagement feature having:
  - (a) a vertical opening in the top surface of the side ramp for removably receiving the vertical member of a tool; and
  - (b) an undercut extending horizontally from the slot into the side ramp for removably engaging the horizontal protrusion of a tool to enable an upward force on the tool to be exerted on the tool engagement feature, to thereby disengage the edge connectors and detach the side ramp from the center section.

9. The modular cable protector of claim 8 wherein edge connectors comprise complementary sets of male and female edge connectors on the lateral edges of the side ramp and center section.

10. The modular cable protector of claim 9 wherein the tool engagement feature is adjacent to an edge connector of the side ramp.

11. A modular cable protector for use with a tool having a vertical member and a horizontal protrusion extending from the lower end of the vertical member, said modular cable protector comprising:
- a center section having opposing ends, at least one lateral edge, at least one channel extending in parallel between the ends for receiving cables, and a top lid providing access to the channels;
- at least one side ramp for removably attachment to an edge of the center section, each side ramp having a base, opposing ends, a lateral edge, and a sloped top surface forming a ramp to the center section;
- complementary sets of male edge connectors on the edge of the center section and female edge connectors on the edge of the side ramp for removably attaching the side ramp to the center section;
- complementary sets of end connectors on the ends of the side ramp or center section for removably connecting a plurality of like cable protectors in series with the channels in alignment with the channels of adjacent cable protectors;
- a substantially vertical slot in a male edge connector for removably receiving the vertical member of a tool; and
- an undercut extending horizontally from the slot into the adjacent female edge connector for removably engaging the horizontal protrusion of a tool to enable an upward force on the tool to be exerted on the side ramp, to thereby disengage the edge connectors and detach the side ramp from the center section.

\* \* \* \* \*